United States Patent [19]

Peris

[11] Patent Number: 4,699,551
[45] Date of Patent: Oct. 13, 1987

[54] METHOD AND APPARATUS FOR MEASURING MACHINE CUTTING TOOL POSITIONS

[75] Inventor: James P. Peris, Germantown, Md.

[73] Assignee: The United States of America as represented by the Secretary of Commerce, Washington, D.C.

[21] Appl. No.: 838,726

[22] Filed: Mar. 11, 1986

[51] Int. Cl.$^4$ ............................................. B01G 7/03
[52] U.S. Cl. ...................................... 409/218; 33/557; 33/560
[58] Field of Search ................ 408/116, 218; 409/204, 409/205, 206, 207, 208, 209, 210–218; 33/172 E, 557, 560, 556, 558, 561; 82/36 A

[56] References Cited

U.S. PATENT DOCUMENTS

| | | | |
|---|---|---|---|
| 3,990,153 | 11/1976 | Calame | 33/503 |
| 4,136,458 | 1/1979 | Bell et al. | 33/172 E |
| 4,208,157 | 6/1980 | Guarino et al. | 409/218 |
| 4,443,946 | 4/1984 | McMurtry | 33/561 |

FOREIGN PATENT DOCUMENTS 1009689  6/1952  France ............................... 33/172 E

*Primary Examiner*—Z. R. Bilinsky
*Attorney, Agent, or Firm*—Alvin J. Englert; Stanley C. Spooner

[57] ABSTRACT

An apparatus and method are provided for on-line measurement of a lathe cutting tool position using a measuring head with a rotatable square plate engaged with three cylindrical plungers and a positioning mechanism for pivoting the measuring head. The positioning mechanism includes a movable member mounted on a base on the lathe headstock and a rotating unit for rotating the movable member about an axis. A stop member is provided to stop the movable member at a locating position. The measuring head includes a square plate supported inside a housing and rotatable about a y-axis therein. The plungers extend into the housing to contact the plate near its corners. In response to a force applied by a cutting tool mounted in a turret, the plungers move respectively in +x, −x, −z directions relative to the housing to cause the square plate to rotate correspondingly. A transducer detects the rotation of the square plate and provides an output signal which is calibrated to yield an indication of the absolute displacement of the plunger and hence the position of the cutting tool relative to a machine datum position.

5 Claims, 6 Drawing Figures

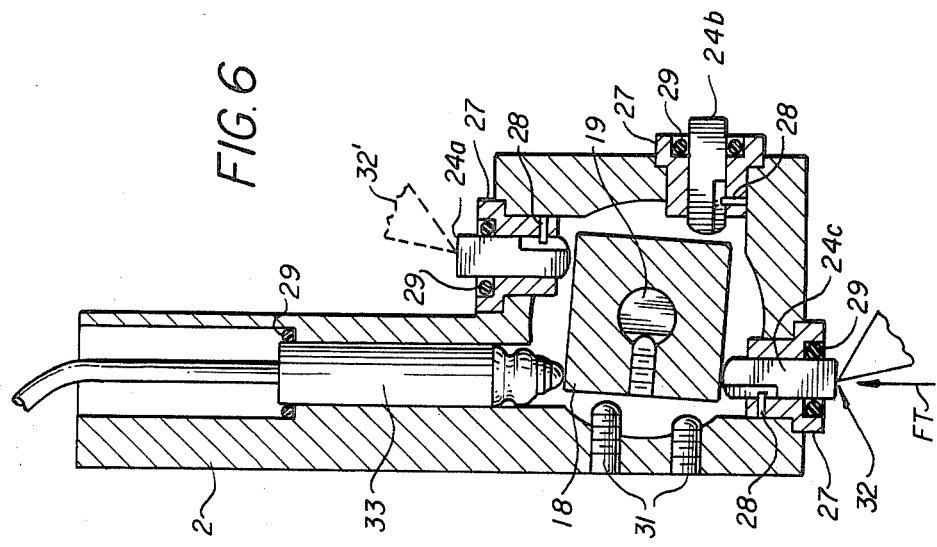
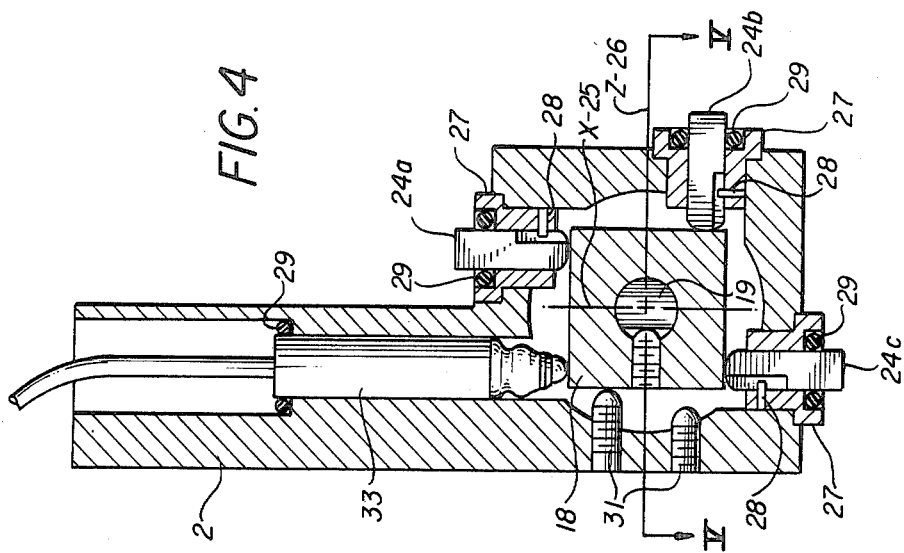

4,699,551

METHOD AND APPARATUS FOR MEASURING MACHINE CUTTING TOOL POSITIONS

BACKGROUND OF THE INVENTION

1. Field of the Invention

This invention relates to on-line measurement of machine cutting tool positions, particularly positions of lathe cutting tools such as drilling and boring tools.

2. Discussion of the Prior Art

A known such device is disclosed in U.S. Pat. No. 4,443,946. This known device includes an elongate stylus 14 attached to a member 12 that is movable in three dimensions relative to a fixed frame 11. The deflection of the free end 14c of the stylus 14 relative to the fixed member 11 is detected by a transducer 21 connected between the stylus 14 and said fixed member 11. This device is primarily used in the measurement of workpieces, which is why it is capable of measurement in three dimensions, i.e., in x, y and z directions. However, it should be noted that only two dimensions, e.g., x and z directions, are necessary for measuring lathe tooling.

To adapt this known device for tool gauging, it is necessary to attach special fixtures to it. One method for doing this is to permanently fix the probe such that it will not be in the way of normal machining operations. However, this is disadvantageous because the farther away the probe is from the datum position, the more subject it will be to thermal expansions due to minor temperature changes. Another method is to insert the probe in the spindle as if it were a collet. This procedure would greatly reduce the errors due to thermal growth, but it would also require removing the spindle tooling every time a cutting tool is gauged, which is not desirable.

To achieve a three-dimensional operation, the device disclosed in U.S. Pat. No. 4,443,946 uses a stylus supported on the fixed member for universal pivotal motion and for longitudinal motion. The pivotal motion causes sliding between the stylus and the cutting tool, which will introduce unknown errors depending on the initial presetting of the tool. Similar errors will occur in the longitudinal direction if the motion of the tool tip is slightly offset from the longitudinal axis of the device. Also, the construction of this type of device is expensive and it requires an excessive amount of space, which is frequently not available.

SUMMARY OF THE INVENTION

It is therefore an object of the present invention to provide a new and improved on-line machine cutting tool position measurement system which substantially overcomes the above-described deficiencies in the prior art.

Accordingly, one object of this invention is to provide an apparatus for moving a measuring head to and from a locating position near the datum position of a machine tool such as a lathe in a repeatable manner.

It is another object to provide such an apparatus which will not interfere with any machining processes, or spindle or turret tooling.

It is also an object to provide such an apparatus which will minimize errors due to thermal expansion between the device and the datum position.

Another object of this invention is to provide a compact, inexpensive, and accurate measuring head capable of gauging lathe cutting tools.

It is yet another object to provide such a device, the construction of which permits parallel displacement of three plungers in the $+x$, $-x$, and $-z$ directions and requires only one transducer to detect all three motions.

Briefly, the present invention is directed to an apparatus for on-line measurement of positions of a machine cutting tool, e.g., a lathe cutting tool, using a measuring head with a rotatable square plate engaged with a plurality of cylindrical plungers and a position mechanism for pivoting the measuring head. The positioning mechanism moves the measuring head repeatedly to and from a locating position near the lathe's datum position. Specifically, the positioning mechanism includes a movable member mounted on a base on the headstock and means for rotating the movable member about an axis, with a stop member to stop the movable member at the locating position. The movable member is mounted on a shaft which rotates on precision pre-loaded bearings. Ground spacers are mounted between the movable member and the bearings to allow no motion of the movable member along the aforesaid axis relative to the base. The aforesaid square plate is rotatable about a y-axis relative to a housing in which it is mounted. Preferably, three cylindrical plungers are employed which extend into the housing to contact the plate near its corners. When contacted by the cutting tool, the plungers move respectively in $+x$, $-x$ and $-z$ directions relative to the housing to cause the square plate to rotate correspondingly. A transducer detects the rotation of the square plate and provides an output which is calibrated to yield an indication of the absolute displacement of the plunger, and hence the position of the cutting tool relative to the datum position of the machine tool. As used herein, the terms "machine" and "machine tool" are interchangeable.

More broadly, according to the present invention, there is provided a measuring head for measurement of a position of a machine cutting tool, e.g., the position of a lathe cutting tool, relative to a datum position on the machine. The measuring head comprises a housing supported on the machine tool, a plate supported inside the housing, at least two elongated plungers which engage with the cutting tool and the plate, and a position transducing means. The plate is rotatably supported about an axis oriented transversely to a face of the plate. The aforesaid at least two plungers are each mounted on the housing, such that one end of each plunger extends into the interior of the housing. Each plunger has a free end extending outside the housing for engagement with the machine cutting tool and another end engageable with the plate inside the housing. Each plunger is slidable in a rectilinear stroke toward and away from the plate to cause its aforesaid another end to push the plate. Each plunger is oriented off-center relative to the axis about which the plate is rotatable, so that the sliding movement of each plunger in at least a portion of the rectilinear stroke relative to the plate causes the plate to rotate about the aforesaid axis. The position transducer means is mounted on the housing and engages with the plate. The position transducer means measures rotation of the plate about the aforesaid axis and produces an output signal representing an amount of rotation of the plate and a corresponding displacement of a plunger which produced this rotation. Preferably, the plate is substantially flat and square in shape, and the aforesaid axis is oriented substantially perpendicularly to the face of the plate. Also, there are preferably three plungers disposed substantially coplanar with the plate, with two of the plungers being generally parallel to each other and disposed to engage opposite corners of the plate, and with another of the plungers being disposed generally perpendicular to the aforesaid two plungers to engage another corner of the plate.

Also according to the present invention, there is provided a positioning mechanism for positioning a measuring head relative to a machine tool, which comprises a base member fixed to the machine tool, a movable member carrying the measuring head and being rotatably supported on one end to the base member, a substantially flat-faced plate member fixed to the machine tool, a substantially spherical-faced plate member fixed to the movable member and disposed to engage the flat-faced plate member when the movable member is rotated relative to the base member to a locating position thereof, and a means, connected to the movable member, for rotating the movable member relative to the machine tool.

Also according to the present invention, a method is provided for measuring a position of a machine cutting tool relative to a datum position on a machine tool, said machine cutting tool being, e.g., mounted in a turret which is mounted on a bed of the machine tool and which is located in a predetermined or known position relative to said datum position. The method comprises (a) providing a plate supported inside a housing supported on the machine tool, with the plate being rotatably supported about an axis which is oriented transversely relative to a face of the plate, (b) providing at least two elongated plungers which are mounted on the housing to extend into the interior of the housing, each plunger having a free end extending outside the housing for engaging with the machine cutting tool and another end engageable with the plate, each plunger being oriented off-center relative to the axis about which the plate is rotatable, (c) mounting a position transducer means on the housing in engagement with the plate, (d) separately sliding said plungers in rectilinear strokes toward said plate to engage therewith to cause said plate to rotate about said axis, (e) measuring the rotation of the plate about the aforesaid axis, responsive to separate sliding actions of the plungers, using the position transducer means, and (f) producing output signals with the position transducer means representing amounts of said rotation and corresponding separate displacements of said plungers along said rectilinear strokes.

BRIEF DESCRIPTION OF THE DRAWINGS

The above and other objects, advantages and features of the present invention will be more fully understood when considered in conjunction with the following figures, of which:

FIG. 4 is a sectional elevational view of the measuring head according to the invention;

FIG. 6 is a view similar to that of FIG. 5 illustrating the device in an operational mode.

DETAILED DESCRIPTION OF THE PREFERRED EMBODIMENTS

Figure 1:
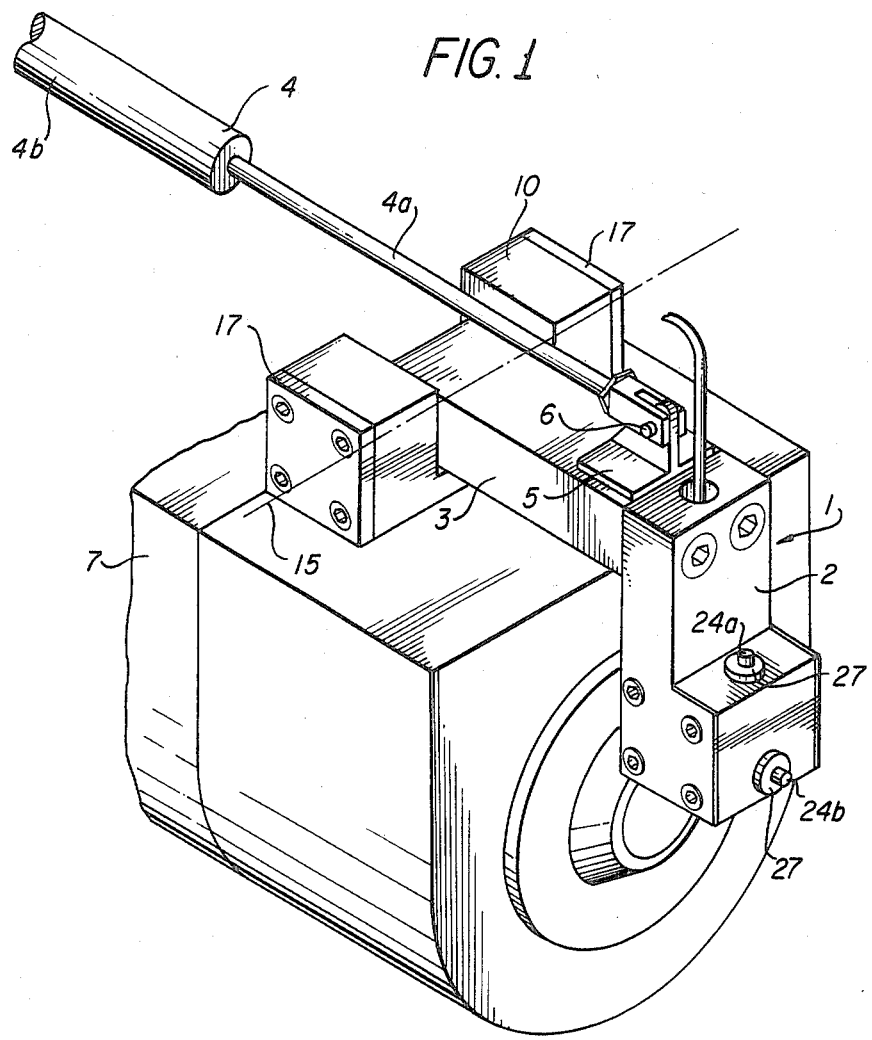
FIG. 1 is a perspective view of the device according to the invention.
Figure 2:
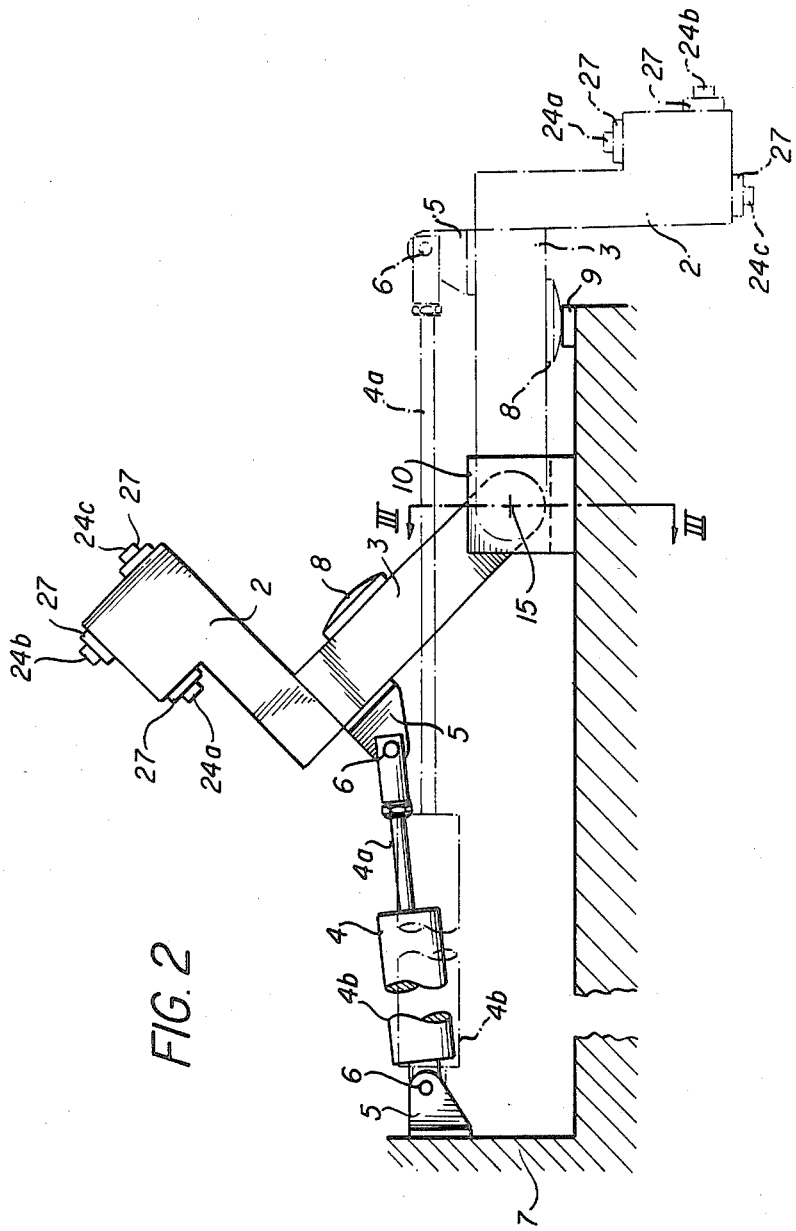
FIG. 2 is a side view of the device of FIG. 1 illustrating two different positions thereof.

Referring to FIGS. 1 and 2, a measuring head, generally denoted 1, includes a housing 2 which is fixed to an elongated member or arm 3. A hydraulic cylinder means 4, comprising a chamber 4b and a piston 4a, is used to rotate arm 3 and measuring head 1 about an axis 15, from a retracted, out-of-the-way position, as shown in FIG. 2, to a gauging position as shown by the dashed line position in FIG. 2. The front end of piston 4a is mounted to arm 3 via a bracket 5 and a clevis pin 6 to allow hydraulic cylinder means 4 to pivot relative to arm 3. The rear end of cylinder chamber 4b is fastened to headstock or housing 7 via a similar mounting bracket 5 and clevis pin 6 assembly to allow the hydraulic cylinder assembly to pivot relative to headstock 7. A plate member 8, having a spherical-shaped face, is connected to arm 3 and contacts a flat-faced plate member 9 fixed to headstock 7 when the device is in the gauging position.

Figure 3:
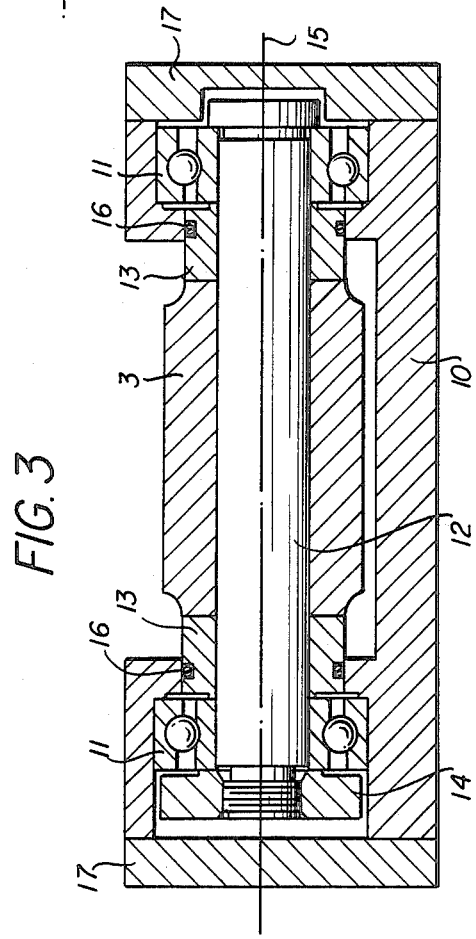
FIG. 3 is a sectional view along the line III—III in FIG. 2.

A base 10, fixed to headstock 7, houses precision pre-loaded ball bearings 11 as shown in FIG. 3. A shaft 12 is fixed to arm 3 and mounted in bearings 11. Two spacers 13, mounted between arm 3 and bearings 11, are formed with a given length so that when a nut 14 is tightened on one end of shaft 12 there is zero motion of arm 3 along axis 15 with respect to base 10. The combination of spherical/flat-faced plate members 8 and 9 and the precision bearing assembly provide a fully constrained repeatable mechanism. Seals 16 and end caps 17 prevent contamination of bearings 11.

Figure 5:
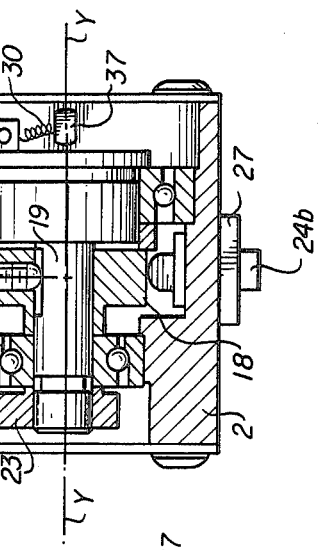
FIG. 5 is a sectional view along the line V—V in FIG. 4.

Referring now to FIGS. 4 and 5, measuring head 1 includes a square plate 18 mounted on a shaft 19 and positioned between two precision preloaded bearings 20a and 20b. A round spacer 21 between one bearing 20b and square plate 18 is used to allow zero movement of shaft 19 along axis y—y when a nut 23 is tightened on one end of shaft 19.

In FIG. 6, cutting tool tip 32 is associated with a tool inserted in a turret (not shown) which may, e.g., be mounted on a bed of the machine tool in a known position relative to headstock 7. The cutting tool can be, e.g., mounted in the turret either manually or by a robot. Due to this manual or robotic positioning, the exact position of the cutting tool relative to the turret is not known with a sufficiently high degree of accuracy, although the position of the turret itself relative to the headstock is, of course, known precisely. It is desired to determine the precise position at which the cutting tool has been inserted within the turret. This can be determined in accordance with the apparatus of the present invention.

Three cylindrical plungers 24a, 24b and 24c, extending into housing 2, have one rounded end for engaging square plate 18 near its corners and one flat-faced free end to receive a force FT from cutting tool tip 32 or 32', as shown in FIG. 6. When no force FT is being applied, plate 18 is not being pushed by any of the plungers, and hence plate 18 and the plungers will occupy respective rest positions due to the action of return tension spring 30, as shown in FIG. 5 and described in detail hereinbelow. These rest positions are shown in FIG. 4. Two plungers 24a and 24c are displaceable relative to the housing 2 in the x-direction 25, and the other plunger 24b is displaceable in the z-direction 26.

In one operational mode, as shown in FIG. 6, plunger 24c is displaced by a force FT acting on its flat-faced free end by engagement with a cutting tool tip 32 associated with, e.g., a boring bar. This displacement causes plunger 24c to be displaced vertically to rotate square plate 18 about axis y—y relative to housing 2, i.e., about an axis extending generally through the center of shaft 19. The corresponding rotation of square plate 18 is then detected by a transducer 33, mounted in housing 2, the output of which is calibrated to correspond with the actual location of cutting tool tip 32 in the x-direction with respect to a machine reference or datum position. Similarly, a displacement of plunger 24a or 24b will produce a similar rotation of plate 18 and a detection by transducer 33.

To obtain the location of cutting tool tip 32 in the z-direction relative to the datum position, the turret in which the tool is mounted is moved so that tool tip 32 engages with side or front plunger 24b, to displace plunger 24b horizontally, thus rotating square plate 18 about axis y—y relative to housing 2. Transducer 33 detects this corresponding rotation of plate 18 and provides a calibrated output which corresponds to the rotation of plate 18 and a corresponding displacement of plunger 24b, and hence to the actual location of cutting tool tip 32 in the z-direction relative to the machine reference or datum position. It should be noted that this datum position can be established relative to the turret; the positions of the turret and the headstock relative to one another are, of course, known.

In accordance with the above, the x- and z-axis positions of tool tip 32 relative to the datum position can be measured to accurately determine the position of tool tip 32 for use on workpieces positioned in the spindle of the machine tool.

In another operational mode, a cutting tool tip 32' mounted in a different type of tool, e.g., a turning tool, is located as shown by the dashed lines in FIG. 6. The turret is moved so that tool tip 32' engages with plunger 24c to displace it vertically to rotate plate 18 about axis y—y relative to housing 2. This rotation of plate 18 is detected by transducer 33, which provides a calibrated output, as described above, to obtain the actual location of tool tip 32' in the x-direction relative to the datum position. The turret is then moved so that tool tip 32' engages plunger 24b to move it horizontally, the same as in the first operational mode described above. Plunger 24b is then used as described above to obtain the tool tip location relative to the datum in the z-direction. Accordingly, the position of tool tip 32' can be precisely determined relative to the datum position so that it can be effectively used on workpieces positioned in the machining tool spindle.

Thus, it is seen that for a tool tip 32' oriented as shown in FIG. 6, plungers 24a and 24b are used, while for a tool tip 32 oriented also as shown in FIG. 6, plungers 24c and 24b will be used.

This simple, compact configuration of plungers 24a, 24b, 24c, square plate 18 and transducer 33 allows both turning and boring tools, as well as other types of tools for operating on a workpiece, to be precisely gauged in the x and z directions of the machine.

Three bushings 27, fixed in housing 2, provide precision sliding fits for each respective plunger 24a, 24b and 24c. Each plunger is prevented from rotating via a key 28 in each bushing 27. Seals 29 are also provided to prevent contamination of the inside of housing 2. A spring mechanism 30 is attached at one end of a projection 35 from shaft 19, and at another end to projection 37 from housing 2. Spring 30 returns square plate 18 to its original rest position after force FT from the tool tip has been removed. Two set screws 31 are used to adjust the limits of travel of square plate 18.

The method according to the present invention of positioning a machine tool relative to a datum position on a machine tool. First, a plate 18 is supported inside housing 2 which is supported on headstock 7, with plate 18 being rotatably supported about an axis y—y oriented transversely to a face of plate 18. At least two spaced apart elongated plungers, e.g., plungers 24a and 24b or plungers 24c and 24b, are mounted on housing 2 to extend into the interior of housing 2. Each plunger has a free end extending outside of housing 2 for engaging with machine cutting tool tip 32 or 32' and another end engageable with plate 18 inside housing 2. Each plunger is oriented off-center relative to axis y—y about which plate 18 is rotatable. A position transducer means 33 is mounted on housing 2 in engagement with plate 18. The position of the machine cutting tool is measured as follows. The plungers are separately slid in rectilinear strokes toward plate 18 to push plate 18 to cause it to rotate about axis y—y. Then, amounts of rotation of plate 18 about axis y—y, responsive to the aforesaid separate sliding actions of the plungers, are measured using position transducer means 33. Position transducer means 33 is used to produce output signals representing the aforesaid amounts of rotation and corresponding separate displacements of the plungers. This information is then processed to obtain a measurement of the location of tool tip 32 or 32' relative to a datum position on the machine tool. The method can further comprise forming the plate to be substantially flat and square in shape, with the axis about which the plate is rotatable being oriented substantially perpendicular to the face of the plate, and providing first, second and third plungers. The method preferably includes positioning the plungers to be substantially coplanar with plate 18, positioning two of the plungers generally parallel to each other to engage with diagonally opposite corners of plate 18 and positioning another of the plungers generally normal to the aforesaid two plungers to engage another corner of the plate.

The above description and the accompanying drawings are merely illustrative of the application of the principles of the present invention and are not limiting. Numerous other arrangements which embody the principles of the invention and which fall within its spirit and scope may be readily devised by those skilled in the art. Accordingly, the invention is not limited by the foregoing description, but is only limited by the scope of the appended claims.

What is claimed is:

1. A measuring head for measuring a position of a machine cutting tool relative to a datum position on a machine tool, comprising:

a housing supported on said machine tool;

a plate supported inside said housing, said plate being rotatably supported about an axis oriented transversely relative to a face of said plate;

at least two elongated plungers mounted on said housing, each plunger having a free end extending outside said housing for engaging with said machine cutting tool and another end engageable with said plate inside said housing, each plunger being slidable in a rectilinear stroke toward and away from said plate, said plungers being spaced apart from each other, each plunger being oriented off-center relative to said axis about which said plate is rotatable so that sliding displacement of each plunger in at least a portion of said rectilinear stroke relative to said plate causes the sliding plunger to push said plate to cause said plate to rotate about said axis;

a position transducer means mounted on said housing and engaging with said plate, for measuring rotation of said plate about said axis and for producing an output signal representing an amount of said rotation and a corresponding displacement of a said plunger;

said plate being substantially flat and square in shape, said axis being oriented substantially perpendicular to said face of said plate, and said plungers comprising first, second and third plungers disposed substantially coplanar with said plate, two said plungers being generally parallel to each other and disposed to engage diagonally opposite corners of said plate, and another of said plungers being disposed generally normal to said two plungers to engage another corner of said plate.

2. The measuring head of claim 1, further comprising a shaft rotatably supporting said plate about said axis, precision pre-loaded bearings rotatably supporting said shaft, and a ground spacer means mounted between one of said bearings and said plate to prevent axial motion of said plate relative to said axis.

3. The measuring head of claim 1, wherein each plunger is keyed to said housing to allow no rotation of said plungers relative to said housing.

4. The measuring head of claim 1, further comprising a spring attached on one end to said housing and on another end to one of said shaft and said plate to provide a bias to return said plate and said plungers to respective rest positions.

5. A method of measuring a position of a machine cutting tool relative to a datum position on a machine tool, comprising:

providing a plate supported inside a housing supported on said machine tool, said plate being rotatably supported about an axis oriented transversely to a face of said plate;

mounting at least two spaced apart elongated plungers on said housing to extend into said interior of said housing, each plunger having a free end extending outside said housing for engaging with said machine cutting tool and another end engageable with said plate inside said housing, each plunger being oriented off-center relative to said axis about which said plate is rotatable;

mounting a position transducer means on said housing in engagement with said plate;

separately sliding said plungers in rectilinear strokes toward said plate to push said plate to cause said plate to rotate about said axis;

using said position transducer means to measure amounts of rotation of said plate about said axis, responsive to separate sliding actions of said plunger;

producing output signals with said position transducer means, said output signal representing said amounts of said rotation and corresponding separate displacements of said plungers; and forming said plate to be substantially flat and square in shape, said axis being oriented substantially perpendicular to said face of said plate, said plungers comprising first, second and third plungers, positioning said plungers substantially coplanar with said plate, positioning two said plungers generally parallel to each other and to engage with diagonally opposite corners of said plate and positioning another of said plungers generally normal to said two plungers to engage another corner of said plate.

* * * * *